(12) United States Patent
Sato et al.

(10) Patent No.: US 11,769,891 B2
(45) Date of Patent: Sep. 26, 2023

(54) FUEL CELL SYSTEM AND CONTROL METHOD AT TIME OF STARTING-UP FUEL CELL SYSTEM

(71) Applicant: HONDA MOTOR CO., LTD., Tokyo (JP)

(72) Inventors: Shinnosuke Sato, Wako (JP); Akiji Ando, Wako (JP); Joji Nakashima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/680,349

(22) Filed: Feb. 25, 2022

(65) Prior Publication Data

US 2022/0320545 A1   Oct. 6, 2022

(30) Foreign Application Priority Data

Mar. 30, 2021   (JP) ................ 2021-057899

(51) Int. Cl.
| | | |
|---|---|---|
| H01M 8/04 | (2016.01) | |
| H01M 8/04746 | (2016.01) | |
| H01M 8/04082 | (2016.01) | |
| H01M 8/04225 | (2016.01) | |
| H01M 8/249 | (2016.01) | |
| H01M 8/04537 | (2016.01) | |
| H01M 8/04302 | (2016.01) | |

(52) U.S. Cl.
CPC ... *H01M 8/04753* (2013.01); *H01M 8/04201* (2013.01); *H01M 8/04225* (2016.02); *H01M 8/04302* (2016.02); *H01M 8/04559* (2013.01); *H01M 8/249* (2013.01)

(58) Field of Classification Search
CPC ......... H01M 8/04753; H01M 8/04225; H01M 8/04201
See application file for complete search history.

(56) References Cited

U.S. PATENT DOCUMENTS

| | | | |
|---|---|---|---|
| 2020/0185739 A1* | 6/2020 | Ito | ............ B60L 1/003 |
| 2021/0143459 A1* | 5/2021 | Ikeda | ................ H01M 8/04179 |

FOREIGN PATENT DOCUMENTS

| | | |
|---|---|---|
| JP | 2007-149621 | 6/2007 |
| JP | 2008-146900 | 6/2008 |
| JP | 2008-210697 | 9/2008 |
| JP | 2013-208001 | 10/2013 |
| JP | 2015-146258 | 8/2015 |
| JP | 2015-153563 | 8/2015 |

(Continued)

OTHER PUBLICATIONS

Japanese Office Action for Japanese Patent Application No. 2021-057899 dated Nov. 22, 2022.

(Continued)

*Primary Examiner* — Olatunji A Godo

(74) *Attorney, Agent, or Firm* — AMIN, TUROCY & WATSON, LLP

(57) ABSTRACT

A fuel cell system (300) in which, at the time of starting up a first fuel cell set (109a) and a second fuel cell set (109b), one of a first air supply unit (102a) or a second air supply unit (102b) is driven and then the another air supply units is driven so that electric power of the another air supply units reaches a peak after an output voltage of the one of the fuel cell stacks reaches the first output value.

17 Claims, 13 Drawing Sheets

(56) References Cited

FOREIGN PATENT DOCUMENTS

| JP | 2016-081647 | 5/2016 |
| JP | 2017-220296 | 12/2017 |
| JP | 2020-031030 | 2/2020 |
| JP | 2022-117829 | 8/2022 |
| WO | 2017/135180 | 8/2017 |
| WO | 2022/030514 | 2/2022 |

OTHER PUBLICATIONS

Japanese Office Action for Japanese Patent Application No. 2021-057899 dated Apr. 18, 2023.
Japanese Notice of Allowance for Japanese Patent Application No. 2021-057899 dated Jul. 4, 2023.

* cited by examiner

FIG. 14

| MODE | STARTUP TYPE | TOTAL FIRST-STAGE DRIVE POWER | SECOND-STAGE START-UP TIMING |
|---|---|---|---|
| 1 | BOTH BANKS START IN ORDER | $2 \times A$ | QUICK START |
| 2 | SINGLE BANK BYPASS | $2 \times b1 + 2 \times C$ | NORMAL |
| 3 | SINGLE BANK BYPASS | $2 \times b2 + 2 \times C$ $b2 < b1$ | SLOW |

IN CASE OF 2 SERIES × 2 PARALLEL

FUEL CELL SYSTEM AND CONTROL METHOD AT TIME OF STARTING-UP FUEL CELL SYSTEM

CROSS-REFERENCE TO RELATED APPLICATION

Priority is claimed on Japanese Patent Application No. 2021-057899, filed Mar. 30, 2021, the content of which is incorporated herein by reference.

BACKGROUND OF THE INVENTION

Field of the Invention

The present invention relates to a fuel cell system and a control method at the time of starting-up the fuel cell system.

Description of Related Art

In the related art, a fuel cell system including a set of a fuel cell stack and an electric air supply device and an electricity storage unit is known (FIG. 1). A fuel cell system 100 having a schematic constitution shown in FIG. 1 includes a fuel cell set 109 including a fuel cell stack 101 and an air supply unit 102, an electricity storage unit 103, and a fuel cell protection diode 105. The fuel cell system 100 is connected to an electric load 107 that is a load. When the fuel cell system 100 is started-up, electric power is supplied from the electricity storage unit 103 to the air supply unit 102, air is supplied from the air supply unit 102 to the fuel cell stack 101, and power generation of the fuel cell stack 101 is started. If the power generation of the fuel cell stack 101 is started, the electric power generated by the fuel cell stack 101 is supplied to the air supply unit 102.

A fuel cell system including a plurality of fuel cells is known. Patent Document 1 (Japanese Unexamined Patent Application, First Publication No. 2020-031030) describes a fuel cell system which includes a first fuel cell, a second fuel cell having a maximum output electric power larger than that of the first fuel cell, and a power generation control unit configured to control power generation of the first fuel cell and the second fuel cell in accordance with required electric power.

The power generation control unit of Patent Document 1 causes the first fuel cell to generate electric power so that the required electric power is mainly generated using the first fuel cell when the required electric power is less than a first threshold value. The power generation control unit causes the second fuel cell to generate electric power so that the required electric power is mainly generated using the second fuel cell when the required electric power is equal to or more than a second threshold value which is the first threshold value or more and less than a third threshold value which is larger than the second threshold value and larger than 50% with respect to a sum of a maximum output electric power of the first fuel cell and a maximum output electric power of the second fuel cell. The power generation control unit causes the first fuel cell and the second fuel cell to generate electric power so that the required electric power is generated using both of the first fuel cell and the second fuel cell when the required electric power is the third threshold value or more.

When the fuel cell system is operated, driving an auxiliary device such as a valve in a system is required. Patent Document 2 (Japanese Unexamined Patent Application, First Publication No. 2007-149621) describes a fuel cell system including a fuel cell and a low voltage power supply having a low voltage among secondary batteries having different voltages. The fuel cell system drives or stops a low voltage auxiliary device driven using the low voltage power supply in accordance with the condition of a low voltage power supply system when the fuel cell system is started-up.

SUMMARY OF THE INVENTION

In the fuel cell system described in Patent Document 1, the electric power required for driving the auxiliary devices included in the plurality of fuel cells also increases, the capacity of the battery increases, and a size of the system increases. For this reason, it is difficult to stably perform startup control of the plurality of fuel cells and to reduce a size of the fuel cell system.

The fuel cell system described in Patent Document 2 does not start up a plurality of fuel cells and is likely to delay starting up due to insufficient electric power when a storage battery deteriorates and the capacity thereof decreases.

When the fuel cell system 100 shown in FIG. 1 is used, if the fuel cell set 109 including the fuel cell stack 101 and the air supply unit 102 is parallelized, it is possible to obtain a large amount of electric power. However, when a plurality of fuel cell stacks 101 are started up, increasing the capacity of the electricity storage unit 103 for supplying electric power to a plurality of air supply units 102 is required. Thus, it is not possible to prevent a size of the fuel cell system 100 from increasing.

The present invention was made in consideration of such circumstances, and an object of the present invention is to provide a fuel cell system in which a plurality of sets of fuel cell stack and air supply unit and an electricity storage unit configured to supply electric power to the air supply units are provided and the electricity storage unit supplies electric power to the plurality of air supply units and a peak electric power consumption of the air supply units can be reduced, and a control method at the time of starting-up the fuel cell system.

The fuel cell system and the control method at a startup of the fuel cell system according to the present invention have adopted the following constitution.

(1) A fuel cell system according to an aspect of the present invention includes: a first fuel cell set including a first fuel cell stack and a first air supply unit configured to supply air to the first fuel cell stack; a second fuel cell set including a second fuel cell stack and a second air supply unit configured to supply air to the second fuel cell stack; an electricity storage unit configured to supply electric power to the first air supply unit and the second air supply unit which are electrically connected in parallel; a connection unit through which output voltages of the first fuel cell stack and the second fuel cell stack are able to be applied to the first air supply unit and the second air supply unit; and a control unit configured to control the first fuel cell set and the second fuel cell set, wherein the first fuel cell stack and the second fuel cell stack are connected to an electric load, and at the time of starting up the first fuel cell set and the second fuel cell set, the control unit drives one of the first air supply unit and the second air supply unit and then drives the another air supply units so that an electric power peak of the another air supply units reaches the peak after an output voltage of the one of the fuel cell stacks reaches the first output value.

According to this constitution, it is possible to realize stable starting-up while minimizing an increase in capacity of the electricity storage unit and a size thereof. Particularly, it is possible to reduce a capacity of the electricity storage unit as much as possible using electric power of a fuel cell stack which has started-up before the another air supply units is driven.

(2) In the aspect of the above (1), the fuel cell system may further include: a third fuel cell set including a third fuel cell stack connected to the first fuel cell stack in series and a third air supply unit configured to supply air to the third fuel cell stack; and a fourth fuel cell set including a fourth fuel cell stack connected to the second fuel cell stack in series and a fourth air supply unit configured to supply air to the fourth fuel cell stack, wherein the third air supply unit and the fourth air supply unit may be electrically connected to the first air supply unit and the second air supply unit in parallel.

According to this constitution, it is possible to increase an output range of the fuel cell system while increasing a capacity of the electricity storage unit and minimizing a size thereof.

(3) In the aspect of the above (2), the control unit may determine the number of fuel cell sets to operate based on a required output of an electric load, operate at least one of the fuel cell sets, start to start up the at least one of the fuel cell sets, and then adjust a drive state of each of the air supply units configured to supply air to each of the fuel cell stacks to match a time at which an output voltage of each of the fuel cell stacks connected in series reaches the first output value.

According to this constitution, it is possible to increase a capacity of the electricity storage unit and minimize a size thereof by shifting a peak of the air supply unit while minimizing a counter electromotive force of the fuel cell stack.

(4) In the aspect of the above (2) or (3), the control unit may adjust the drive state of the air supply unit configured to supply air to the fuel cell stack at the time of starting up the fuel cell set in accordance with the remaining capacity of the electricity storage unit.

According to this constitution, it is possible to stably start up the fuel cell system by adjusting a height of a peak in accordance with the remaining capacity of the electricity storage unit.

(5) In the aspect of the above (1), the fuel cell system may further include: a first discharge passage through which hydrogen is discharged from the first fuel cell stack; a second discharge passage through which hydrogen is discharged from the second fuel cell stack; a confluent part of the first discharge passage and the second discharge passage; a first bypass path through which air supplied from the first air supply unit bypasses the first fuel cell stack by switching the air using a first supply path switching unit and is supplied to the first discharge passage or the confluent part; and a second bypass path through which air supplied from the second air supply unit bypasses the second fuel cell stack by switching the air using a second supply path switching unit and is supplied to the second discharge passage or the confluent part, wherein the control unit may operate the first fuel cell set based on a required output of the electric load, and when the second fuel cell set is stopped, start to drive the first air supply unit, and then start to drive the second air supply unit, and supply air to the confluent part via the second bypass path.

According to this constitution, it is possible to reliably dilute hydrogen while reducing a load on the operating air supply unit of the fuel cell set.

(6) In the aspect of the above (5), the second air supply unit may be driven with an amount of discharge larger than that at a discharge pressure of the confluent part associated with the drive of the first fuel cell set.

According to this constitution, it is possible to minimize a backflow of a bypass path.

(7) In the aspect of the above (2), the fuel cell system may further include: a first discharge passage through which hydrogen is discharged from the first fuel cell stack; a second discharge passage through which hydrogen is discharged from the second fuel cell stack; a third discharge passage through which hydrogen is discharged from the third fuel cell stack; a fourth discharge passage through which hydrogen is discharged from the fourth fuel cell stack; a confluent part of the first discharge passage, the second discharge passage, the third discharge passage, and the fourth discharge passage; a first bypass path through which air supplied from the first air supply unit bypasses the first fuel cell stack by switching the air using a first supply path switching unit and is supplied to the first discharge passage or the confluent part; a second bypass path through which air supplied from the second air supply unit bypasses the second fuel cell stack by switching the air using a second supply path switching unit and is supplied to the second discharge passage or the confluent part; a third bypass path through which air supplied from the third air supply unit bypasses the third fuel cell stack by switching the air using a third supply path switching unit and is supplied to the third discharge passage or the confluent part; and a fourth bypass path through which air supplied from the fourth air supply unit bypasses the fourth fuel cell stack by switching the air using a fourth supply path switching unit and is supplied to the fourth discharge passage or the confluent part, wherein the control unit may operate the first fuel cell set based on a required output of the electric load, when the second fuel cell set, the third fuel cell set, and the fourth fuel cell set are stopped, start to drive the first air supply unit, and then start to drive the second air supply unit, the third air supply unit, and the fourth air supply unit, and supply air to the confluent part via the second bypass path, the third bypass path, and the fourth bypass path.

According to this constitution, it is possible to reliably dilute hydrogen while reducing a load on the operating air supply unit of the fuel cell set.

(8) In the aspect of the above (7), the second air supply unit, the third air supply unit, and the fourth air supply unit may be driven with an amount of discharge larger than that at a discharge pressure of the confluent part associated with the drive of the first fuel cell set.

According to this constitution, it is possible to minimize a backflow of a bypass path.

(9) A control method at the time of starting-up a fuel cell system according to an aspect of the present invention which includes a first fuel cell set including a first fuel cell stack and a first air supply unit configured to supply air to the first fuel cell stack; a second fuel cell set including a second fuel cell stack and a second air supply unit configured to supply air to the second fuel cell stack; an electric load connected to the first fuel cell stack and the second fuel cell stack which are electrically connected in parallel; an electricity storage unit configured to supply electric power to the first air supply unit and the second air supply unit which are electrically connected in parallel; a connection unit through which output voltages of the first fuel cell stack and the second fuel cell stack are able to be applied to the first air supply unit and the second air supply unit; and a control unit configured to control the first fuel cell set and the second fuel cell set, the method including: at the time of starting up the first fuel cell set and the second fuel cell set, driving one of the first air supply unit and the second air supply unit and then driving the another air supply units so that electric power of the another air supply units reaches a peak after an output voltage of the one of the fuel cell stacks reaches the first output value.

According to this constitution, it is possible to realize stable starting-up while increasing a capacity of the electricity storage unit and minimizing a size thereof. Particularly, it is possible to reduce a capacity of the electricity storage unit as much as possible using electric power of the fuel cell stack which has started-up before the another air supply units is driven.

(10) In the aspect of the above (9), the fuel cell system may further include: a third fuel cell set including a third fuel cell stack connected to the first fuel cell stack in series and a third air supply unit configured to supply air to the third fuel cell stack and a fourth fuel cell set including a fourth fuel cell stack connected to the second fuel cell stack in series and a fourth air supply unit configured to supply air to the fourth fuel cell stack, and the third air supply unit and the fourth air supply unit may be electrically connected to the first air supply unit and the second air supply unit in parallel. According to this constitution, it is possible to increase an output range of the fuel cell system while increasing a capacity of the electricity storage unit and minimizing a size thereof.

(11) In the aspect of the above (9), the fuel cell system may further include: a first discharge passage through which hydrogen is discharged from the first fuel cell stack; a second discharge passage through which hydrogen is discharged from the second fuel cell stack; a confluent part of the first discharge passage and the second discharge passage; a first bypass path through which air supplied from the first air supply unit bypasses the first fuel cell stack by switching the air using a first supply path switching unit and is supplied to the first discharge passage or the confluent part; and a second bypass path through which air supplied from the second air supply unit bypasses the second fuel cell stack by switching the air using a second supply path switching unit and is supplied to the second discharge passage or the confluent part, the first fuel cell set may be operated based on a required output of the electric load, when the second fuel cell set is stopped, the first air supply unit may be started to be driven, and then the second air supply unit may be started to be driven, and the air may be supplied to the confluent part via the second bypass path.

According to this constitution, it is possible to reliably dilute hydrogen while reducing a load on the operating air supply unit of the fuel cell set.

(12) In the aspect of the above (10), the fuel cell system may further include: a first discharge passage through which hydrogen is discharged from the first fuel cell stack; a second discharge passage through which hydrogen is discharged from the second fuel cell stack; a third discharge passage through which hydrogen is discharged from the third fuel cell stack; a fourth discharge passage through which hydrogen is discharged from the fourth fuel cell stack; a confluent part of the first discharge passage, the second discharge passage, the third discharge passage, and the fourth discharge passage; a first bypass path through which air supplied from the first air supply unit bypasses the first fuel cell stack by switching the air using a first supply path switching unit and is supplied to the first discharge passage or the confluent part; a second bypass path through which air supplied from the second air supply unit bypasses the second fuel cell stack by switching the air using a second supply path switching unit and is supplied to the second discharge passage or the confluent part; a third bypass path through which air supplied from the third air supply unit bypasses the third fuel cell stack by switching the air using a third supply path switching unit and is supplied to the third discharge passage or the confluent part; and a fourth bypass path through which air supplied from the fourth air supply unit bypasses the fourth fuel cell stack by switching the air using a fourth supply path switching unit and is supplied to the fourth discharge passage or the confluent part, and the first fuel cell set may be operated based on a required output of the electric load, when the second fuel cell set, the third fuel cell set, and the fourth fuel cell set is stopped, the first air supply unit may be started to be driven, and then the second air supply unit, the third air supply unit, and the fourth air supply unit may be started to be driven, and the air may be supplied to the confluent part via the second bypass path, the third bypass path, and the fourth bypass path.

According to this constitution, it is possible to reliably dilute hydrogen while reducing a load on the operating air supply unit of the fuel cell set.

According to the aspects of the above (1) to (12), it is possible to provide a fuel cell system in which a plurality of sets of fuel cell stack and air supply unit and an electricity storage unit configured to supply electric power to the air supply unit are provided and the electricity storage unit supplies electric power to the plurality of air supply units and a peak electric power consumption of the air supply units can be reduced, and a control method at the time of starting-up the fuel cell system. Furthermore, it is possible to minimize the generation of stack reverse potential at startup and to minimize a size of the electricity storage unit.

Therefore, it is possible to reduce a concentration of hydrogen contained in an exhaust gas without increasing an output of an electricity storage unit.

BRIEF DESCRIPTION OF THE DRAWINGS

FIG. 14 is a table for explaining a startup mode of the fuel cell system in the embodiment.

DETAILED DESCRIPTION OF THE INVENTION

A fuel cell system and a control method at the time of starting-up the fuel cell system according to the present invention will be described below with reference to the drawings. The fuel cell system associated with an embodiment is installed in, for example, an electric device operating using electric power. Examples of the electric device include moving bodies such as electric vehicles, railroad vehicles, flying objects (for example, aircrafts, drones, and the like), ships, and robots. The electric device may include stationary type and portable type devices.

Figure 1:
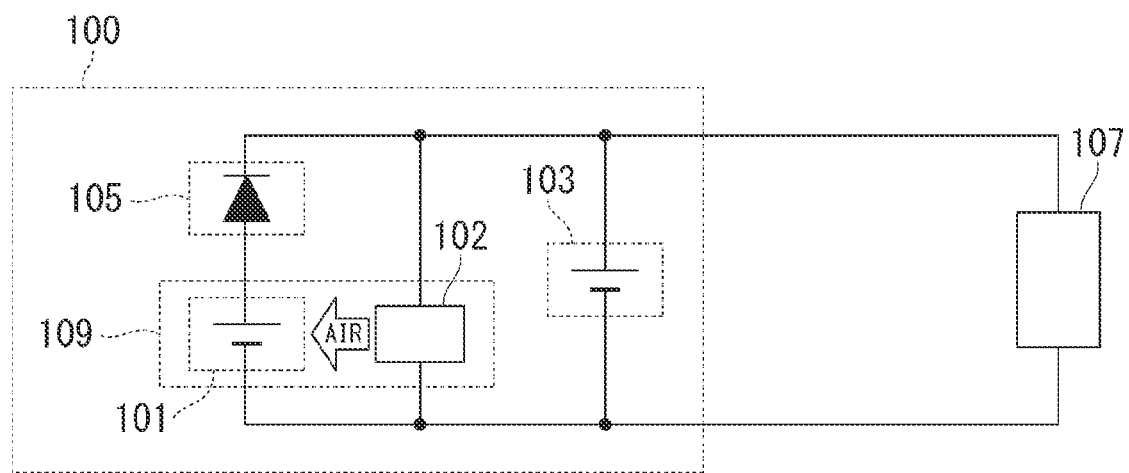
FIG. 1 is a diagram showing a schematic constitution of an example of a fuel cell system in the related art.
Figure 2:
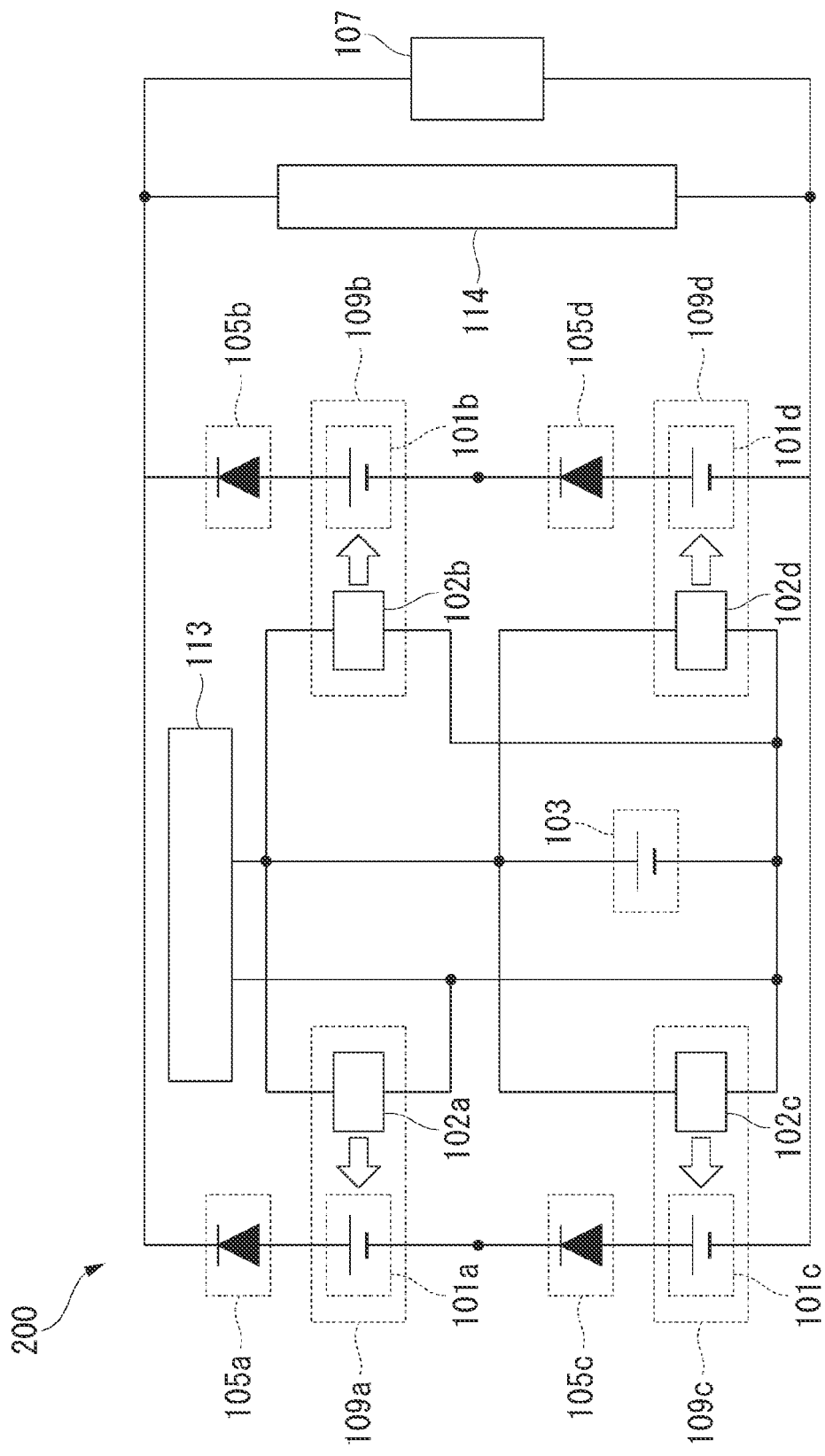
FIG. 2 is a diagram showing a schematic constitution of an example of a fuel cell system in an embodiment.

An example of the fuel cell system in the embodiment is a fuel cell system 200 shown in FIG. 2.

The fuel cell system 200 includes a first fuel cell bank including a first fuel cell set 109a and a third fuel cell set 109c, a second fuel cell bank including a second fuel cell set 109b and a fourth fuel cell set 109d, an electricity storage unit 103, and a control device.

The first fuel cell bank includes the first fuel cell set 109a and the third fuel cell set 109c and a first fuel cell stack 101a and a third fuel cell stack 101c are connected in series.

The second fuel cell bank includes the second fuel cell set 109b and the fourth fuel cell set 109d and a second fuel cell stack 101b and a fourth fuel cell stack 101d are connected in series.

The first fuel cell bank and the second fuel cell bank are electrically connected in parallel.

The first fuel cell set 109a includes the first fuel cell stack 101a and a first air supply unit 102a which supplies air to the first fuel cell stack 101a.

The second fuel cell set 109b includes the second fuel cell stack 101b and a second air supply unit 102b which supplies air to the second fuel cell stack 101b.

The third fuel cell set 109c includes the third fuel cell stack 101c and a third air supply unit 102c which supplies air to the third fuel cell stack 101c.

The fourth fuel cell set 109d includes the fourth fuel cell stack 101d and a fourth air supply unit 102d which supplies air to the fourth fuel cell stack 101d. The first fuel cell stack 101a and the third fuel cell stack 101c are electrically connected in series.

The second fuel cell stack 101b and the fourth fuel cell stack 101d are electrically connected in series.

The first fuel cell stack 101a and the third fuel cell stack 101c, and the second fuel cell stack 101b and the fourth fuel cell stack 101d are electrically connected in parallel.

The electricity storage unit 103 supplies electric power to the first air supply unit 102a, the second air supply unit 102b, the third air supply unit 102c, and the fourth air supply unit 102d which are electrically connected in parallel.

Also, a connection unit through which an output voltage of the fuel cell stack 101 can be applied to the air supply unit 102 and a control unit (not shown) which controls the fuel cell set 109 are provided.

The first fuel cell bank and the second fuel cell bank are connected to the electric load 107. The electric load 107 is, for example, a motor configured to drive a vehicle.

In the fuel cell system in the embodiment, at the time of starting up the first fuel cell set 109a and the second fuel cell set 109b, the control unit drives one of the first air supply unit 102a and the second air supply unit 102b and then drives the another air supply units so that electric power of the another air supply units reaches a peak after an output voltage of the one of the fuel cell stacks reaches the first output value.

It is preferable that the fuel cell system 200 cause the control unit to determine the number of fuel cell sets to operate based on a required output of the electric load and to adjust a drive state of each of the air supply units which supply air to each of the fuel cell stacks to match a time at which an output voltage of each of the fuel cell stacks connected in series reaches a first output value after operating at least one of the fuel cell sets and starting to start up the at least one of the fuel cell sets.

It is preferable that the fuel cell system 200 cause the control unit to adjust a drive state of the air supply unit 102 which supplies air to the fuel cell stack 101 at the time of starting up the fuel cell set 109 in accordance with the remaining capacity of the electricity storage unit 103.

In the fuel cell system 200, the auxiliary device power supply circuit may be constituted as follows. FIGS. 4 to 11 show a state in which only a portion 200a associated with a first fuel cell set of the fuel cell system shown in FIG. 2 is shown.

Figure 4:
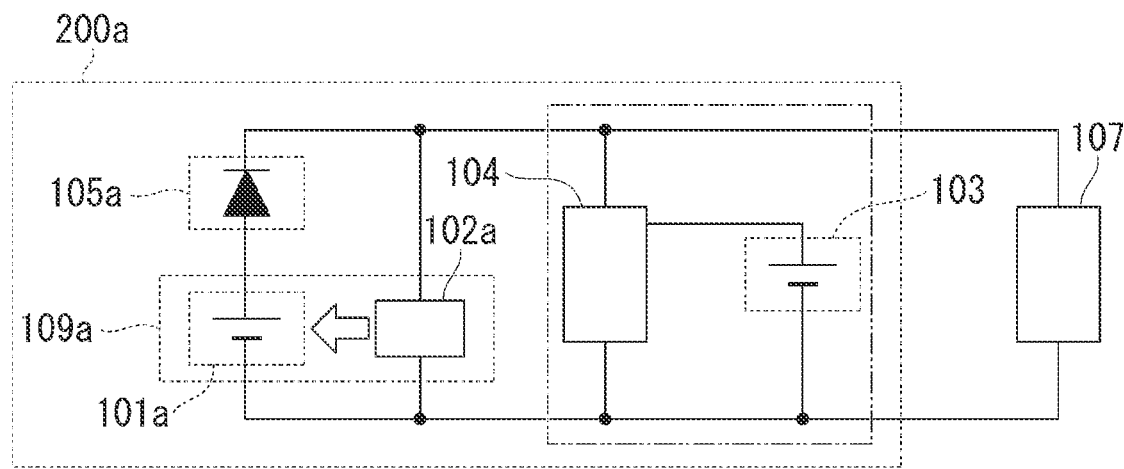
FIG. 4 is a diagram showing a schematic constitution of an example of an auxiliary device power supply circuit in an example of the fuel cell system in the embodiment.

FIG. 4 is an example in which an electricity storage unit DC-DC converter (BVCU) 104 is installed.

Figure 5:
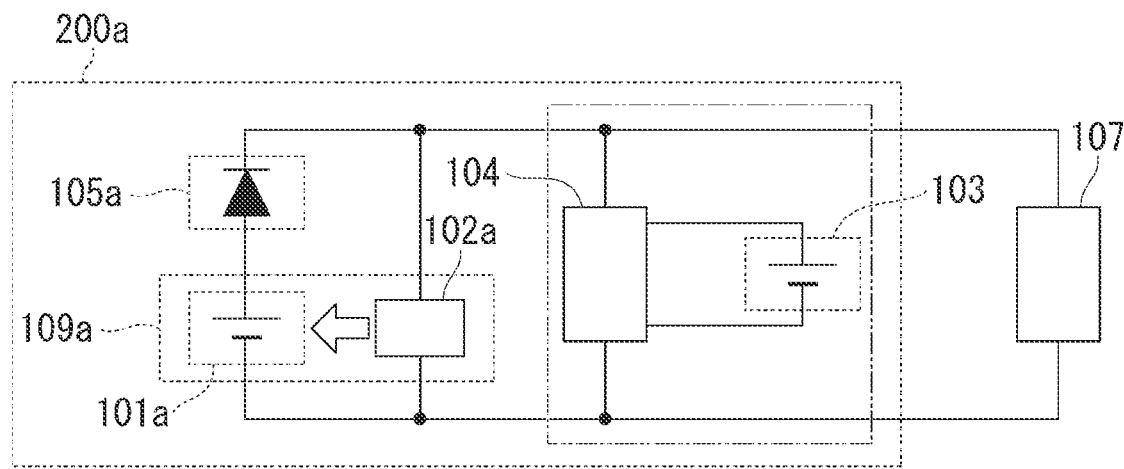
FIG. 5 is a diagram showing a schematic constitution of an example of an auxiliary device power supply circuit in an example of the fuel cell system in the embodiment.

FIG. 5 is a modification of the example shown in FIG. 4 and is an example in which the electricity storage unit 103 is an insulating type.

Figure 6:
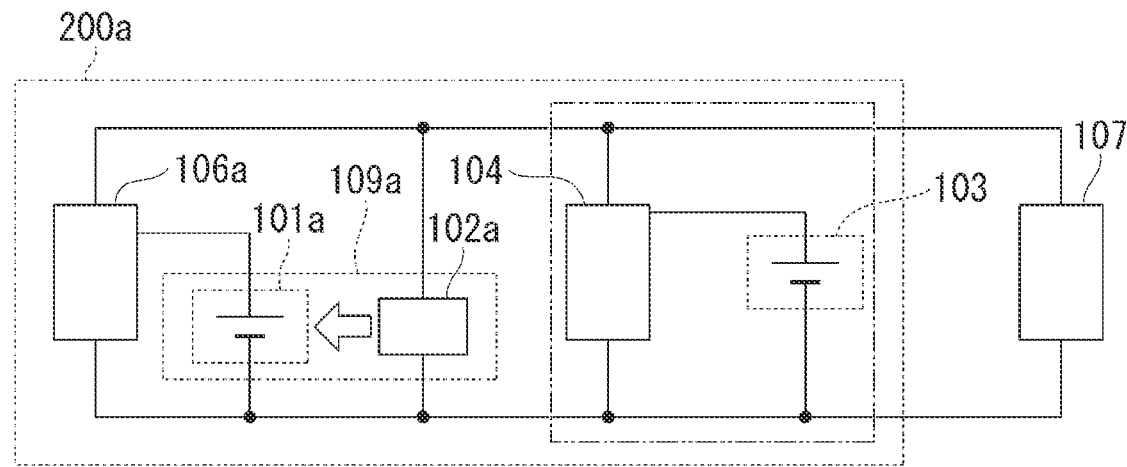
FIG. 6 is a diagram showing a schematic constitution of an example of an auxiliary device power supply circuit in an example of the fuel cell system in the embodiment.

FIG. 6 is an example in which the electricity storage unit DC-DC converter (BVCU) 104 and a fuel cell DC-DC converter (FCVCU) 106 are installed. If FIG. 6 is compared with FIGS. 4 and 5, the fuel cell protection diode 105 can be omitted.

Figure 7:
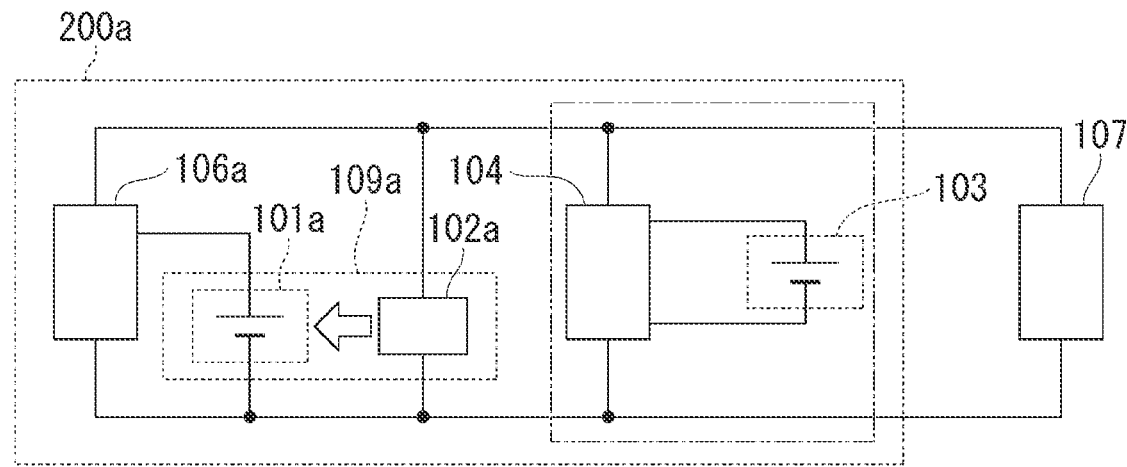
FIG. 7 is a diagram showing a schematic constitution of an example of an auxiliary device power supply circuit in an example of the fuel cell system in the embodiment.

FIG. 7 is a modification of the example shown in FIG. 6 and is an example in which the electricity storage unit 103 is an insulating type.

Figure 8:
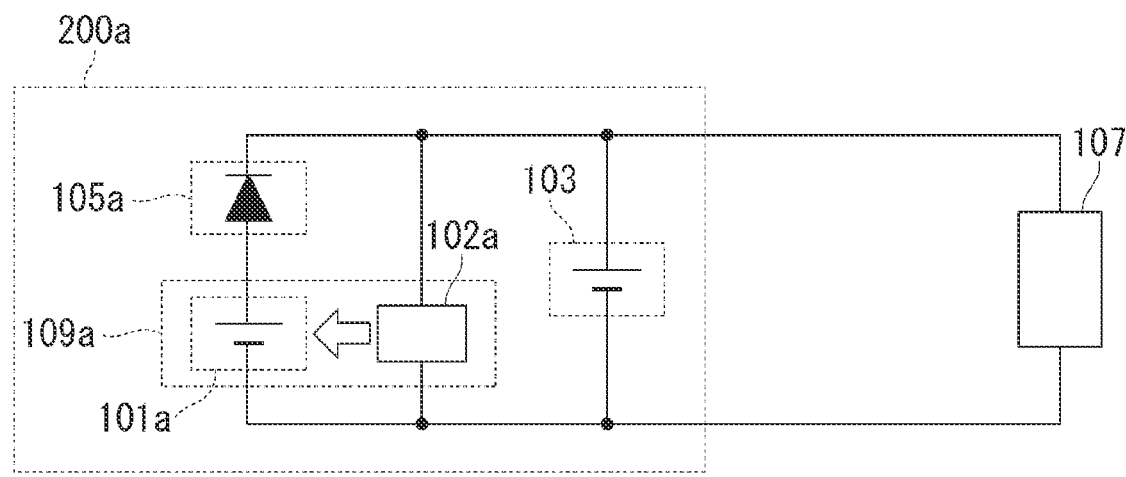
FIG. 8 is a diagram showing a schematic constitution of an example of an auxiliary device power supply circuit in an example of the fuel cell system in the embodiment.

FIG. 8 is an example in which neither the electricity storage unit DC-DC converter (BVCU) 104 nor the fuel cell DC-DC converter (FCVCU) 106 is installed.

Figure 9:
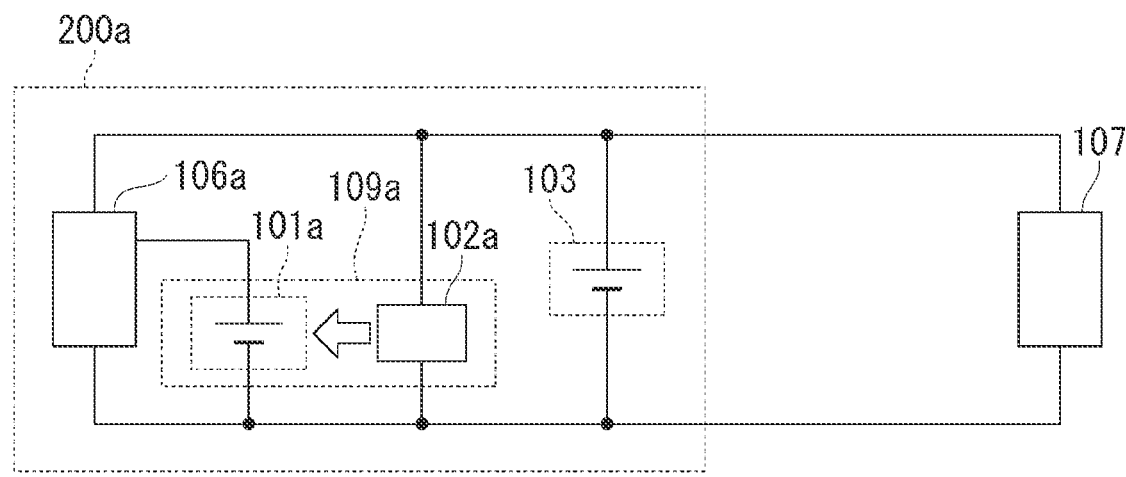
FIG. 9 is a diagram showing a schematic constitution of an example of an auxiliary device power supply circuit in an example of the fuel cell system in the embodiment.

FIG. 9 is an example in which the fuel cell DC-DC converter (FCVCU) 106 is installed.

Figure 10:
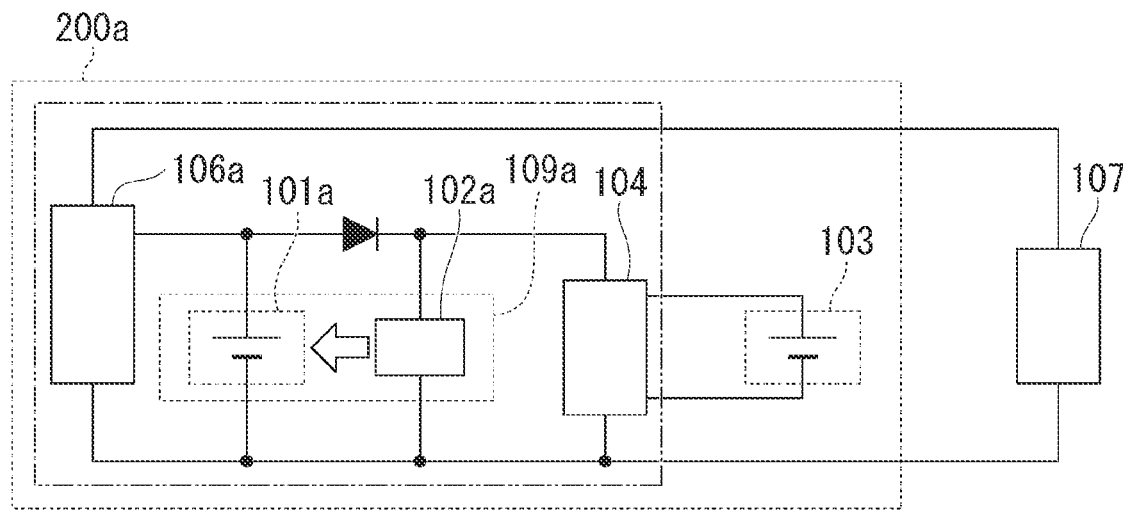
FIG. 10 is a diagram showing a schematic constitution of an example of an auxiliary device power supply circuit in an example of the fuel cell system in the embodiment.

FIG. 10 is an example in which the electricity storage unit DC-DC converter (BVCU) 104 and the fuel cell DC-DC converter (FCVCU) 106 are installed and the electricity storage unit 103 is an insulating type.

Figure 11:
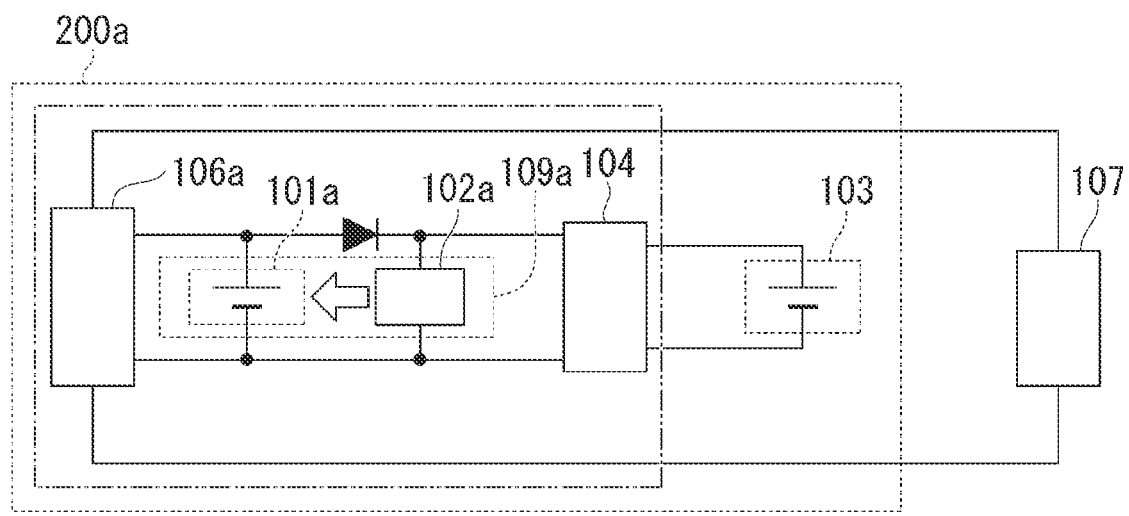
FIG. 11 is a diagram showing a schematic constitution of an example of an auxiliary device power supply circuit in an example of the fuel cell system in the embodiment.

FIG. 11 is a modification of the example shown in FIG. 10 and is an example in which the fuel cell DC-DC converter (FCVCU) 106 is of an insulating type.

Figure 12:
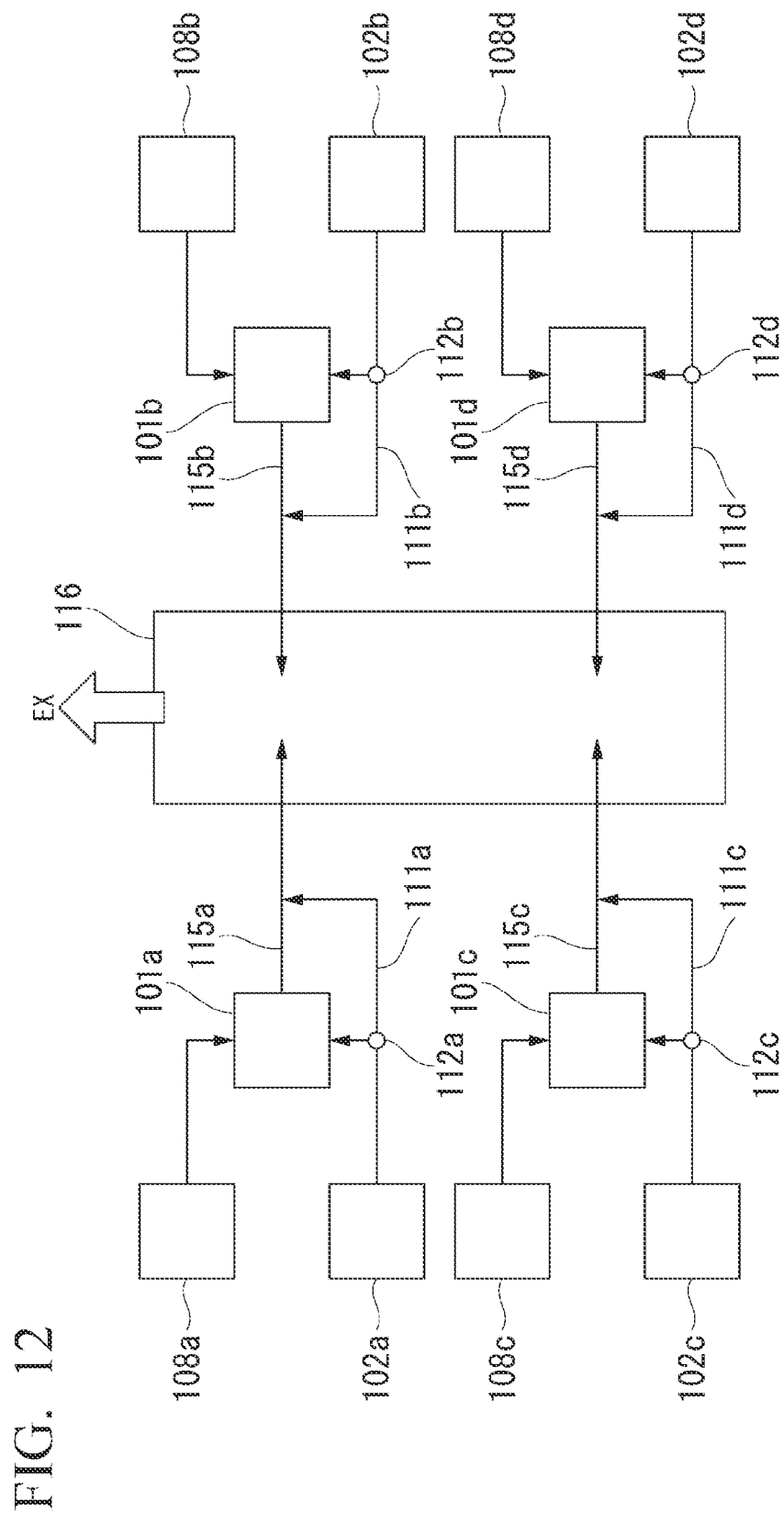
FIG. 12 is a schematic diagram showing a flow of a gas at the time of starting up the fuel cell system in the embodiment.

As shown in FIG. 12, the fuel cell system 200 may further include a first discharge passage 115a, a second discharge passage 115b, a third discharge passage 115c, a fourth discharge passage 115d, a confluent part 116, a first bypass path 111a, a second bypass path 111b, a third bypass path 111c, and a fourth bypass path 111d. The first discharge passage 115a discharges hydrogen from the first fuel cell stack 101a. The second discharge passage 115b discharges hydrogen from the second fuel cell stack 101b. The third discharge passage 115c discharges hydrogen from the third fuel cell stack 101c. The fourth discharge passage 115d discharges hydrogen from the fourth fuel cell stack 101d. The confluent part 116 is a part in which the first discharge passage, the second discharge passage, the third discharge passage, and the fourth discharge passage are confluent. Air supplied from the first air supply unit bypasses a first fuel cell stack by switching the air using a first supply path switching unit 112a and is supplied to a first discharge passage or the confluent part through the first bypass path 111a. Air supplied from a second air supply unit bypasses a second fuel cell stack by switching the air using a second supply path switching unit 112b and is supplied to the second discharge passage or the confluent part through the second bypass path 111b. Air supplied from a third air supply unit bypasses a third fuel cell stack by switching the air using a third supply path switching unit 112c and is supplied to the third discharge passage or the confluent part through the third bypass path 111c. Air supplied from a fourth air supply unit bypasses a fourth fuel cell stack by switching the air using a fourth supply path switching unit 112d and is supplied to the fourth discharge passage or the confluent part through the fourth bypass path 111d. The first bypass path 111a to the fourth bypass path 111d may be collectively referred to as a "bypass path 111" in some cases. The first supply path switching unit 112a to the fourth supply path switching unit 112d may be collectively referred to as a "supply path switching unit 112" in some cases. The first discharge passage 115a to the fourth discharge passage 115d may be collectively referred to as a "stack discharge passage 115" in some cases.

During a period when the stack is stopped, the inside of the stack may be filled with hydrogen together with an anode and a cathode and sealed to prevent the deterioration of the stack in some cases. In the example shown in FIG. 12, hydrogen is supplied to the first fuel cell stack 101a, the second fuel cell stack 101b, the third fuel cell stack 101c, and the fourth fuel cell stack 101d using a first hydrogen supply device 108a, a second hydrogen supply device 108b, a third hydrogen supply device 108c, and a fourth hydrogen supply device 108d, respectively. In this case, when the fuel cell stack is started up, the gas of the air supply unit 102 is discharged to exhaust the filled hydrogen. At the time of exhausting the gas, supplying a large amount of air in the air supply device is required to dilute a hydrogen concentration in the exhaust gas to a safe concentration or less. The first hydrogen supply device 108a to the fourth hydrogen supply device 108d may be collectively referred to as a "hydrogen supply device 108" in some cases.

In the embodiment, an amount of air to be supplied from the air supply unit is minimized to reduce electric power required for the air supply unit at the time of starting-up. Although a hydrogen concentration in the exhaust gas increases through the minimizing, it is possible to efficiently reduce a hydrogen concentration of an assembly part with low power consumption by operating the air supply unit of the fuel cell set which has not started-up using a bypass circuit.

Figure 3:
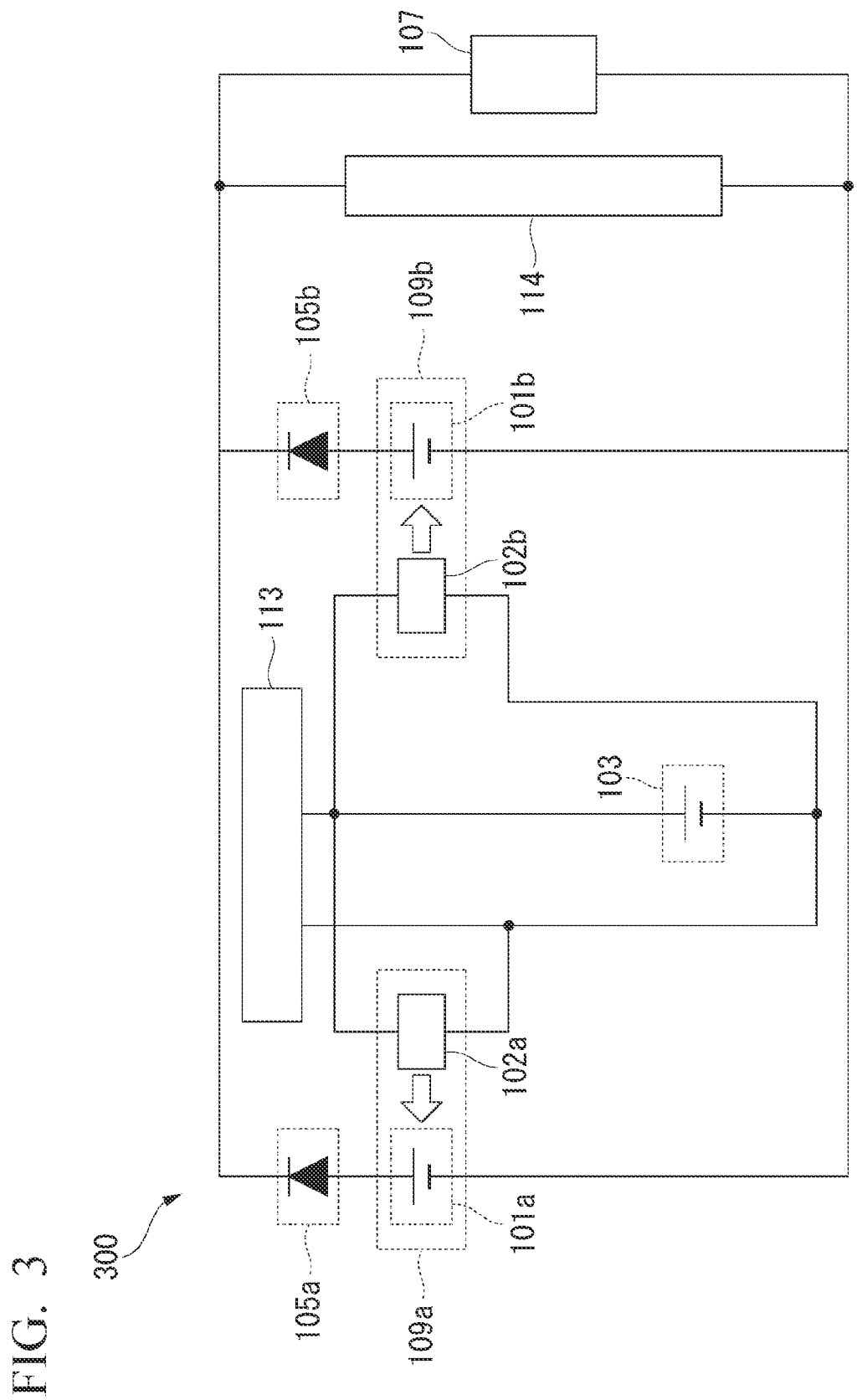
FIG. 3 is a diagram showing a schematic constitution of another example of the fuel cell system in the embodiment.

A fuel cell system 300 shown in FIG. 3 is a fuel cell system obtained by simplifying the fuel cell system in the embodiment shown in FIG. 2 so that the fuel cell system can be easily understood. The fuel cell system 300 includes the first fuel cell set 109a, the second fuel cell set 109b, the electricity storage unit 103, the connection unit, and the control unit (not shown). The first fuel cell set 109a includes the first fuel cell stack 101a and the first air supply unit 102a which supplies air to the first fuel cell stack 101a. The second fuel cell set 109b includes the second fuel cell stack 101b and the second air supply unit 102b which supplies air to the second fuel cell stack 101b. The electricity storage unit 103 supplies electric power to the first air supply unit 102a and the second air supply unit 102b which are electrically connected in parallel. The connection unit can apply output voltages of the first fuel cell stack 101a and the second fuel cell stack 101b to the first air supply unit 102a and the second air supply unit 102b. The control unit controls the first fuel cell set 109a and the second fuel cell set 109b.

The electric load 107 is connected to the first fuel cell stack 101a and the second fuel cell stack 101b.

At the time of starting up the first fuel cell set 109a and the second fuel cell set 109b, the control unit drives one of the first air supply unit 102a and the second air supply unit 102b and then drives the another air supply units so that an electric power peak of the another air supply units reaches the first output value after an output voltage of the one of the fuel cell stacks reaches the first output value.

The second air supply unit 102b is driven with an amount of discharge higher than a discharge pressure at the confluent part associated with the drive of the first fuel cell set.

Figure 13:
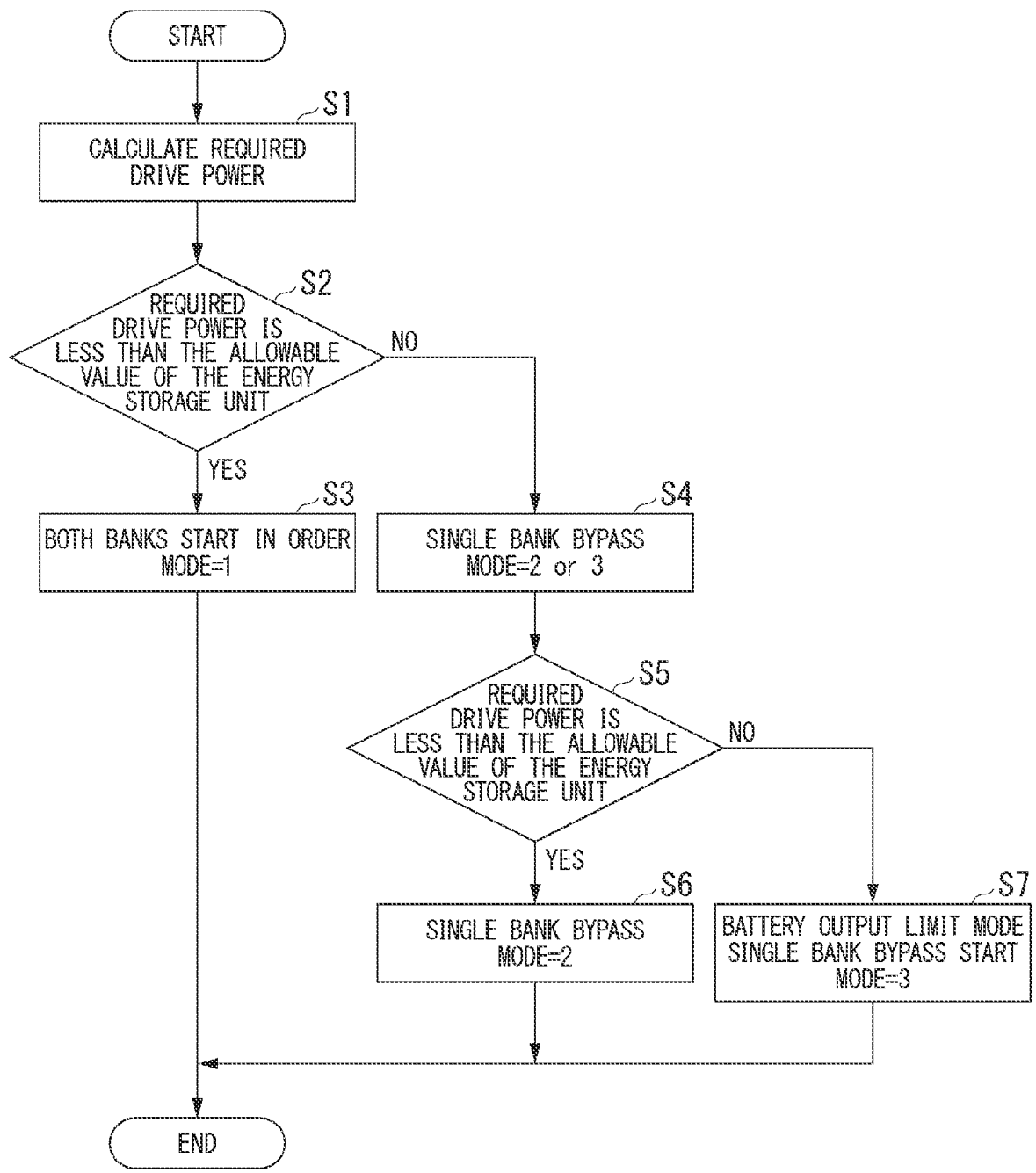
FIG. 13 is a table for explaining a process of starting up the fuel cell system in the embodiment.

As shown in FIGS. 13 and 14, the control method at the time of starting-up the fuel cell system 200 in the embodiment shifts a start timing of the fuel cell bank. Startup modes have MODE=1 to MODE-3 and a mode is selected in accordance with the flow of FIG. 13.

Figure 15:
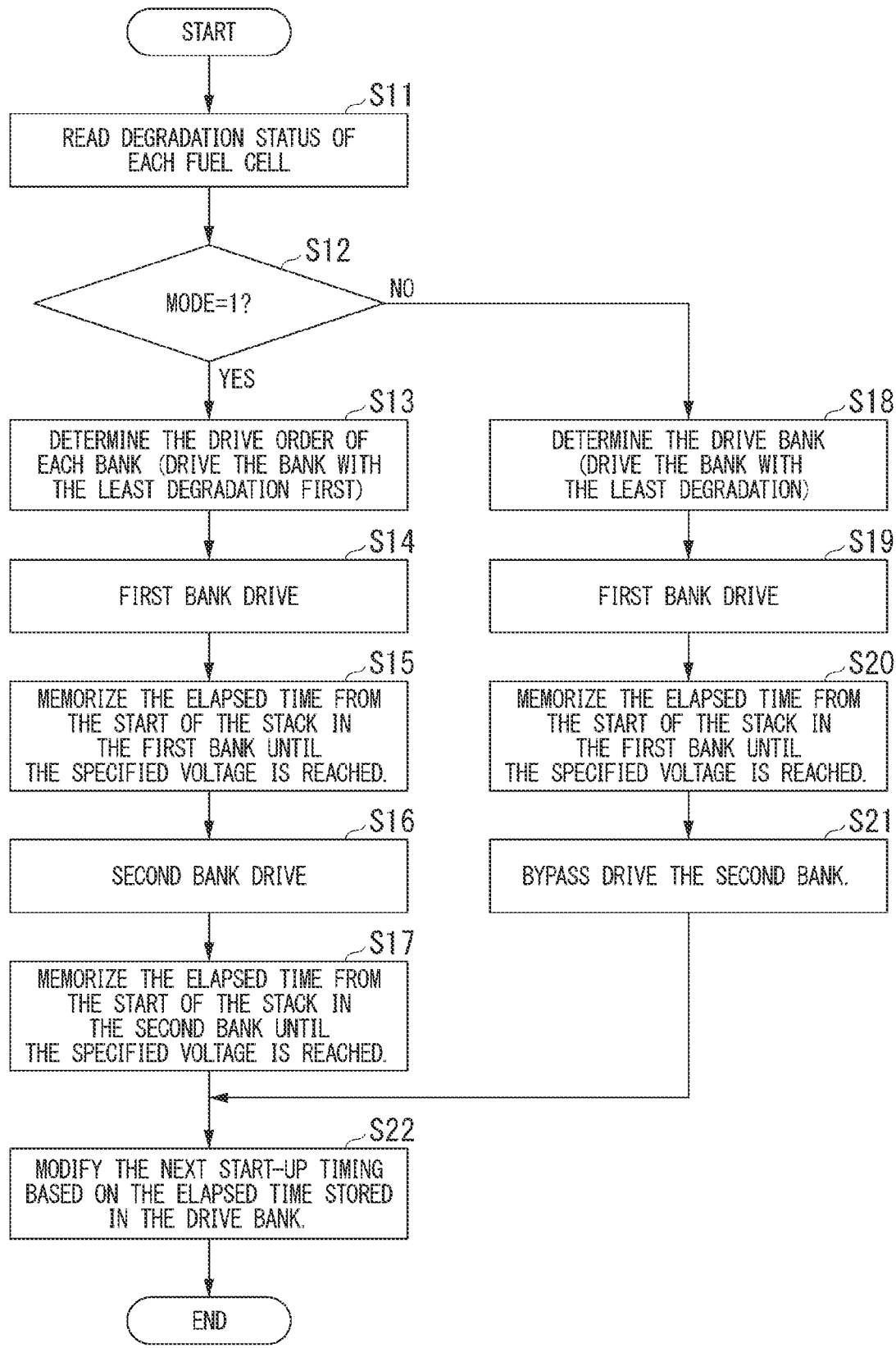
FIG. 15 is a flowchart for describing a process of driving the fuel cell system in the embodiment.

As shown in FIG. 15, a startup mode may be changed to start up the fuel cell bank in accordance with a deterioration state of the fuel cell.

Figure 16:
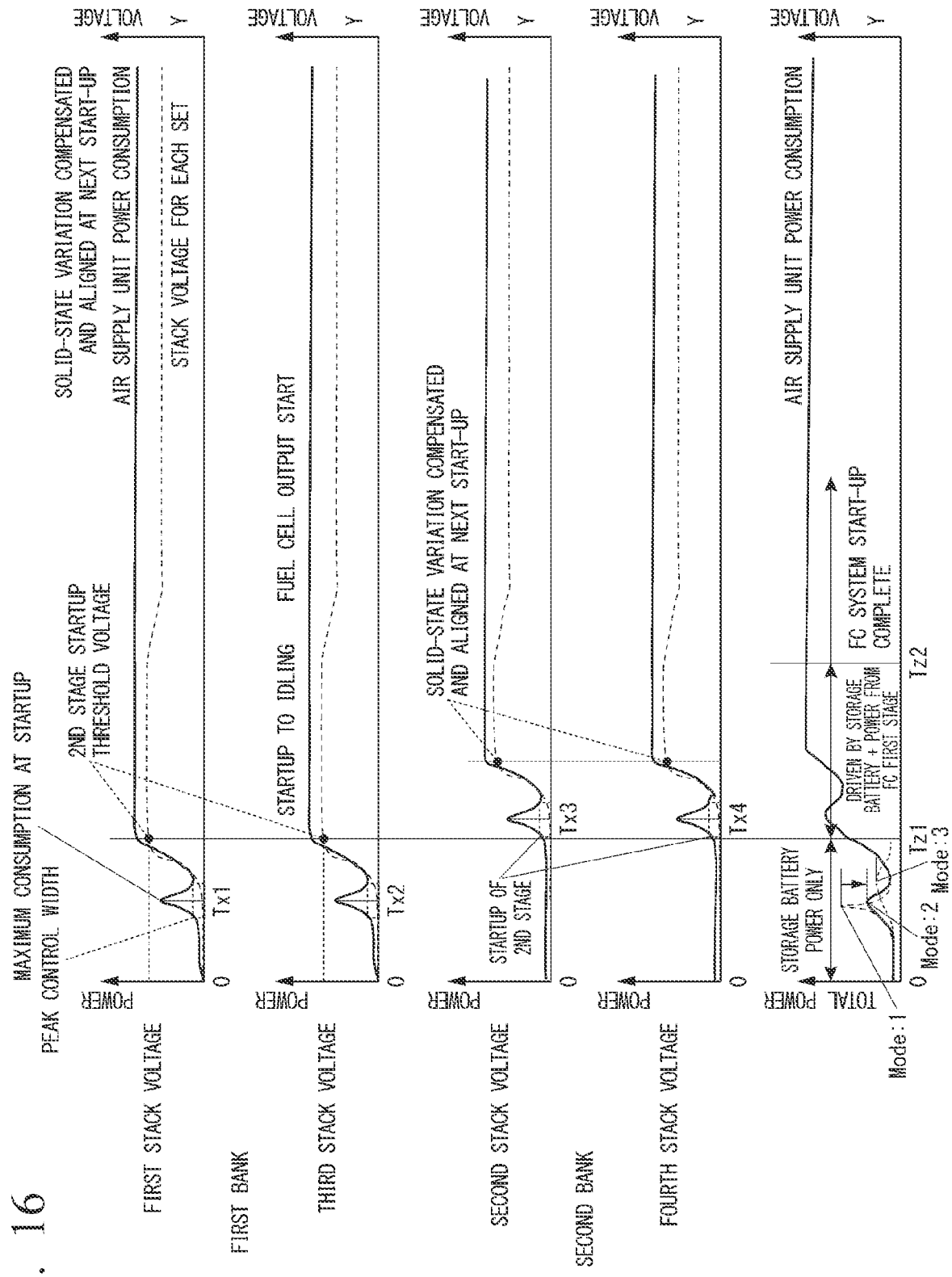
FIG. 16 is a graph showing a time change of a voltage of each fuel cell stack in the case in which the fuel cell system in the embodiment is started-up when MODE=1 is satisfied.
Figure 17:
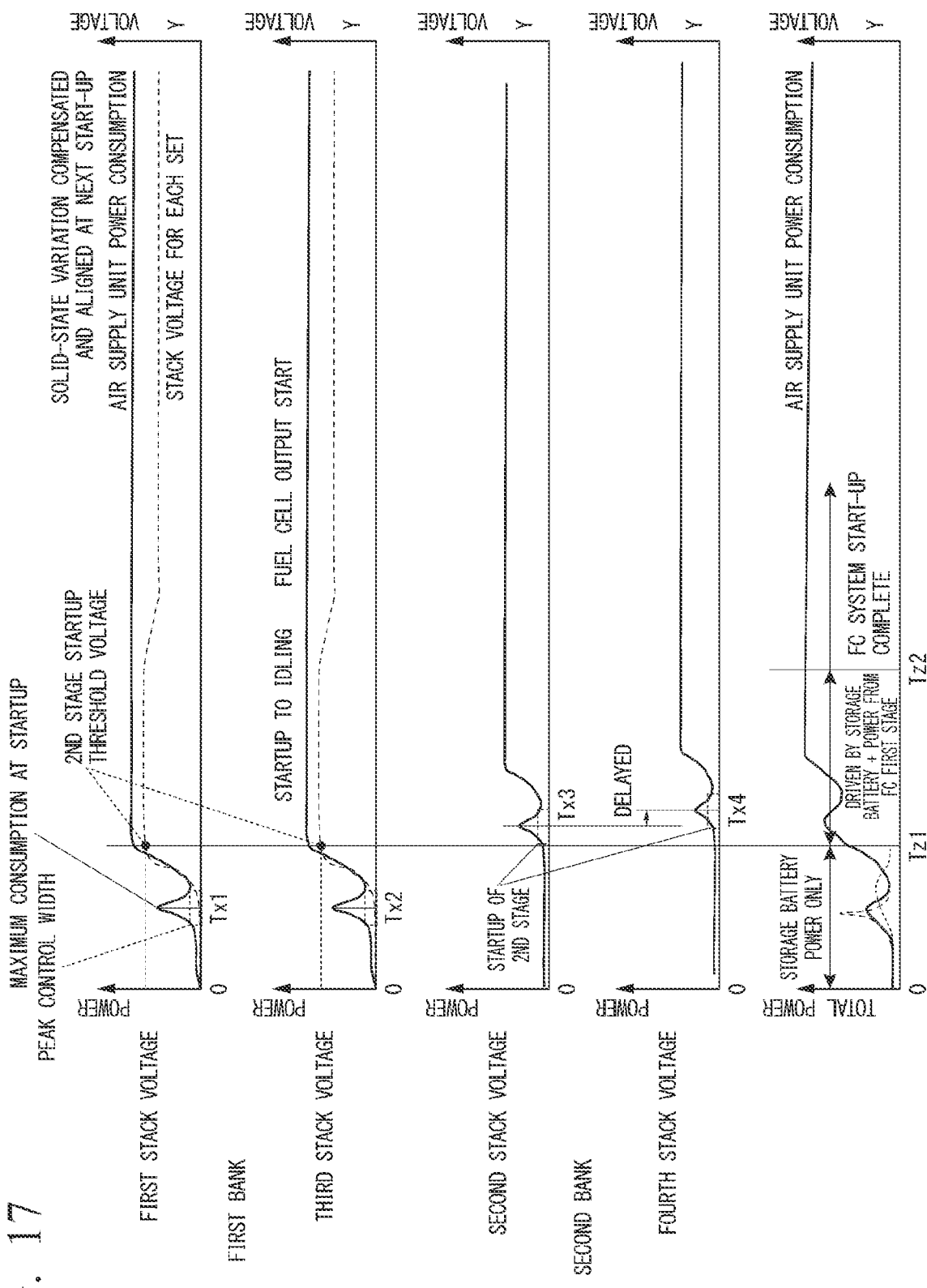
FIG. 17 is a graph showing a time change of a voltage of each fuel cell stack in the case in which the fuel cell system in the embodiment is started-up when MODE=2 is satisfied.

FIGS. 16 and 17 show a voltage of each of the fuel cell stacks when the fuel cell system in the embodiment and the control method at the time of starting-up the fuel cell system are implemented.

When a first-stage stack (first stack and third stack; first bank) is started-up, voltages of the first and third stacks increase so that a startup timing of a second-stage stack (second stack and fourth stack) is determined. When an amount of deviation in a stack voltage increase timing of the first-stage stack is stored in a storage unit and a time difference is set in a startup command at the next startup, the occurrence of reverse potential which occurs in the stack between series is prevented. The same applies to a timing shift in the series after the second stage and a stage subsequent thereto. The variation of the startup command between the stacks is corrected.

When a second bank is started up after a first bank is started up, it is possible to prevent peaks form overlapping and reduce a load on the electricity storage unit (storage battery).

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

100 Fuel cell system
101 Fuel cell stack

101a First fuel cell stack
101b Second fuel cell stack
101c Third fuel cell stack
101d Fourth fuel cell stack
102 Air supply unit
102a First air supply unit
102b Second air supply unit
102c Third air supply unit
102d Fourth air supply unit
103 Electricity storage unit
104 Electricity storage unit DC-DC converter (BVCU)
105 Fuel cell protection diode
106 Fuel cell DC-DC converter (FCVCU)
107 Electric load
108 Hydrogen supply device
108a First hydrogen supply device
108b Second hydrogen supply device
108c Third hydrogen supply device
108d Fourth hydrogen supply device
109 Fuel cell set
109a First fuel cell set
109b Second fuel cell set
109c Third fuel cell set
109d Fourth fuel cell set
111 Bypass path
111a First bypass path
111b Second bypass path
111c Third bypass path
111d Fourth bypass path
112 Supply path switching unit
112a First supply path switching unit
112b Second supply path switching unit
112c Third supply path switching unit
112d Fourth supply path switching unit
113 Auxiliary device power supply circuit
114 Auxiliary device power supply circuit
115 Stack discharge passage
115a First discharge passage
115b Second discharge passage
115c Third discharge passage
115d Fourth discharge passage
116 Confluent part
200 Fuel cell system
300 Fuel cell system
EX Stack exhaust gas

What is claimed is:

1. A fuel cell system, comprising:
a first fuel cell set including a first fuel cell stack and a first air supply unit configured to supply air to the first fuel cell stack;
a second fuel cell set including a second fuel cell stack and a second air supply unit configured to supply air to the second fuel cell stack;
an electricity storage unit configured to supply electric power to the first air supply unit and the second air supply unit which are electrically connected in parallel;
a connection unit through which output voltages of the first fuel cell stack and the second fuel cell stack are able to be applied to the first air supply unit and the second air supply unit; and
a control unit configured to control the first fuel cell set and the second fuel cell set,
wherein the first fuel cell stack and the second fuel cell stack are connected to an electric load, and
at the time of starting up the first fuel cell set and the second fuel cell set when the first fuel cell stack and the second fuel cell stack are filled and sealed with hydrogen, the control unit drives one of the first air supply unit to discharge the hydrogen filled in the first fuel cell stack to reach a maximum power consumption at the time of starting up and then drives the second air supply unit so that the second air supply unit reaches its maximum power consumption at the time of starting up for discharging the hydrogen filled in the second fuel cell stack after an output voltage of the first fuel cell stacks reaches a second stage start-up threshold voltage.

2. A fuel cell system, comprising:
a first fuel cell set including a first fuel cell stack and a first air supply unit configured to supply air to the first fuel cell stack;
a second fuel cell set including a second fuel cell stack and a second air supply unit configured to supply air to the second fuel stack;
an electricity storage unit configured to supply electric power to the first air supply unit and the second air supply unit which are electrically connected in parallel;
a connection unit through which output voltages of the first fuel cell stack and the second fuel cell stack are able to be applied to the first air supply unit and the second air supply unit;
a control unit configured to control the first fuel cell set and the second fuel cell set;
a third fuel cell set including a third fuel cell stack connected to the first fuel cell stack in series and a third air supply unit configured to supply air to the third fuel cell stack; and
a fourth fuel cell set including a fourth fuel cell stack connected to the second fuel cell stack in series and a fourth air supply unit configured to supply air to the fourth fuel cell stack,
wherein the first fuel cell stack and the second fuel cell stack are connected to an electric load,
at the time of starting up the first fuel cell set and the second fuel cell set, the control unit drives one of the first air supply unit and the second air supply unit and then drives another air supply unit so that electric power of the another air supply unit reaches a peak after an output voltage of the one of the fuel cell stacks reaches the first output value, and
wherein the third air supply unit and the fourth air supply unit are electrically connected to the first air supply unit and the second air supply unit in parallel.

3. The fuel cell system according to claim 2, wherein the control unit determines the number of fuel cell sets to operate based on a required output of an electric load, operates at least one of the fuel cell sets,
starts to start up the at least one of the fuel cell sets, and then adjusts a drive state of each of the air supply units configured to supply air to each of the fuel cell stacks to match a time at which an output voltage of each of the fuel cell stacks connected in series reaches the first output value.

4. The fuel cell system according to claim 2, wherein the control unit adjusts the drive state of the air supply unit configured to supply air to the fuel cell stack at the time of starting up the fuel cell set in accordance with the remaining capacity of the electricity storage unit.

5. The fuel cell system according to claim 2, further comprising:
a first discharge passage through which hydrogen is discharged from the first fuel cell stack;
a second discharge passage through which hydrogen is discharged from the second fuel cell stack;

a confluent part of the first discharge passage and the second discharge passage;
a first bypass path through which air supplied from the first air supply unit bypasses the first fuel cell stack by switching the air using a first supply path switching unit and is supplied to the first discharge passage or the confluent part; and
a second bypass path through which air supplied from the second air supply unit bypasses the second fuel cell stack by switching the air using a second supply path switching unit and is supplied to the second discharge passage or the confluent part,
wherein the control unit operates the first fuel cell set based on a required output of the electric load, and when the second fuel cell set is stopped, starts to drive the first air supply unit, and then starts to drive the second air supply unit, and supplies air to the confluent part via the second bypass path.

6. The fuel cell system according to claim 5, wherein the second air supply unit is driven with an amount of discharge larger than that at a discharge pressure of the confluent part associated with the drive of the first fuel cell set.

7. The fuel cell system according to claim 2, further comprising:
a first discharge passage through which hydrogen is discharged from the first fuel cell stack;
a second discharge passage through which hydrogen is discharged from the second fuel cell stack;
a third discharge passage through which hydrogen is discharged from the third fuel cell stack;
a fourth discharge passage through which hydrogen is discharged from the fourth fuel cell stack;
a confluent part of the first discharge passage, the second discharge passage, the third discharge passage, and the fourth discharge passage;
a first bypass path through which air supplied from the first air supply unit bypasses the first fuel cell stack by switching the air using a first supply path switching unit and is supplied to the first discharge passage or the confluent part;
a second bypass path through which air supplied from the second air supply unit bypasses the second fuel cell stack by switching the air using a second supply path switching unit and is supplied to the second discharge passage or the confluent part;
a third bypass path through which air supplied from the third air supply unit bypasses the third fuel cell stack by switching the air using a third supply path switching unit and is supplied to the third discharge passage or the confluent part; and
a fourth bypass path through which air supplied from the fourth air supply unit bypasses the fourth fuel cell stack by switching the air using a fourth supply path switching unit and is supplied to the fourth discharge passage or the confluent part,
wherein the control unit operates the first fuel cell set based on a required output of the electric load, when the second fuel cell set, the third fuel cell set, and the fourth fuel cell set are stopped, starts to drive the first air supply unit, and then starts to drive the second air supply unit, the third air supply unit, and the fourth air supply unit, and supplies air to the confluent part via the second bypass path, the third bypass path, and the fourth bypass path.

8. The fuel cell system according to claim 7, wherein the second air supply unit, the third air supply unit, and the fourth air supply unit are driven with an amount of discharge larger than that at a discharge pressure of the confluent part associated with the drive of the first fuel cell set.

9. A control method at the time of starting-up a fuel cell system which includes:
a first fuel cell set including a first fuel cell stack and a first air supply unit configured to supply air to the first fuel cell stack;
a second fuel cell set including a second fuel cell stack and a second air supply unit configured to supply air to the second fuel cell stack;
an electric load connected to the first fuel cell stack and the second fuel cell stack which are electrically connected in parallel;
an electricity storage unit configured to supply electric power to the first air supply unit and the second air supply unit which are electrically connected in parallel;
a connection unit through which output voltages of the first fuel cell stack and the second fuel cell stack are able to be applied to the first air supply unit and the second air supply unit; and
a control unit configured to control the first fuel cell set and the second fuel cell set, the method comprising:
at the time of starting up the first fuel cell set and the second fuel cell set when the first fuel cell stack and the second fuel cell stack are filled and sealed with hydrogen, driving one of the first air supply unit to discharge the hydrogen filled in the first fuel cell stack to reach a maximum power consumption at the time of starting up and then driving the second air supply unit so that the second air supply unit reaches its maximum power consumption at the time of starting up for discharging the hydrogen filled in the second fuel cell stack after an output voltage of the first fuel cell stacks reaches a second stage start-up threshold voltage.

10. A control method at the time of starting-up a fuel cell system which includes:
a first fuel cell stack and a first air supply unit configured to supply air to the first fuel cell stack;
a second fuel cell set including a second fuel cell stack and a second air supply unit configured to supply air to the second fuel cell stack;
an electric load connected to the first fuel cell stack and the second fuel cell stack which are electrically connected in parallel;
a connection unit through which output voltages of the first fuel cell stack and the second fuel cell stack are able to be applied to the first air supply unit and the second air supply unit;
a control unit configured to control the first fuel cell set and the second fuel cell set; and
a third fuel cell set including a third fuel cell stack connected to the first fuel cell stack in series and a third air supply unit configured to supply air to the third fuel cell stack and a fourth fuel cell set including a fourth fuel cell stack connected to the second fuel cell stack in series and a fourth air supply unit configured to supply air to the fourth fuel cell stack, the method comprising:
at the time of starting up the first fuel cell set and the second fuel cell set, driving one of the first air supply unit and the second air supply unit and then driving another air supply unit so that electric power of the another air supply unit reaches a peak after an output voltage of the one of the fuel cell stacks reaches the first output value, and
the third air supply unit and the fourth air supply unit are electrically connected to the first air supply unit and the second air supply unit in parallel.

11. The control method at the time of starting-up a fuel cell system according to claim 10, wherein the fuel cell system further includes:
- a first discharge passage through which hydrogen is discharged from the first fuel cell stack;
- a second discharge passage through which hydrogen is discharged from the second fuel cell stack;
- a confluent part of the first discharge passage and the second discharge passage;
- a first bypass path through which air supplied from the first air supply unit bypasses the first fuel cell stack by switching the air using a first supply path switching unit and is supplied to the first discharge passage or the confluent part; and
- a second bypass path through which air supplied from the second air supply unit bypasses the second fuel cell stack by switching the air using a second supply path switching unit and is supplied to the second discharge passage or the confluent part,
- the first fuel cell set is operated based on a required output of the electric load, when the second fuel cell set is stopped, the first air supply unit is started to be driven, and then the second air supply unit is started to be driven, and the air is supplied to the confluent part via the second bypass path.

12. The control method at the time of starting-up a fuel cell system according to claim 10, wherein the fuel cell system further includes:
- a first discharge passage through which hydrogen is discharged from the first fuel cell stack;
- a second discharge passage through which hydrogen is discharged from the second fuel cell stack;
- a third discharge passage through which hydrogen is discharged from the third fuel cell stack;
- a fourth discharge passage through which hydrogen is discharged from the fourth fuel cell stack;
- a confluent part of the first discharge passage, the second discharge passage, the third discharge passage, and the fourth discharge passage;
- a first bypass path through which air supplied from the first air supply unit bypasses the first fuel cell stack by switching the air using a first supply path switching unit and is supplied to the first discharge passage or the confluent part;
- a second bypass path through which air supplied from the second air supply unit bypasses the second fuel cell stack by switching the air using a second supply path switching unit and is supplied to the second discharge passage or the confluent part;
- a third bypass path through which air supplied from the third air supply unit bypasses the third fuel cell stack by switching the air using a third supply path switching unit and is supplied to the third discharge passage or the confluent part; and
- a fourth bypass path through which air supplied from the fourth air supply unit bypasses the fourth fuel cell stack by switching the air using a fourth supply path switching unit and is supplied to the fourth discharge passage or the confluent part, and
- the first fuel cell set is operated based on a required output of the electric load, when the second fuel cell set, the third fuel cell set, and the fourth fuel cell set are stopped, the first air supply unit is started to be driven, and then the second air supply unit, the third air supply unit, and the fourth air supply unit are started to be driven, and the air is supplied to the confluent part via the second bypass path, the third bypass path, and the fourth bypass path.

13. The fuel cell system according to claim 1, further comprising:
- a third fuel cell set including a third fuel cell stack connected to the first fuel cell stack in series and a third air supply unit configured to supply air to the third fuel cell stack; and
- a fourth fuel cell set including a fourth fuel cell stack connected to the second fuel cell stack in series and a fourth air supply unit configured to supply air to the fourth fuel cell stack,
- wherein the third air supply unit and the fourth air supply unit are electrically connected to the first air supply unit and the second air supply unit in parallel.

14. The fuel cell system according to claim 1, further comprising:
- a first discharge passage through which hydrogen is discharged from the first fuel cell stack;
- a second discharge passage through which hydrogen is discharged from the second fuel cell stack;
- a confluent part of the first discharge passage and the second discharge passage;
- a first bypass path through which air supplied from the first air supply unit bypasses the first fuel cell stack by switching the air using a first supply path switching unit and is supplied to the first discharge passage or the confluent part; and
- a second bypass path through which air supplied from the second air supply unit bypasses the second fuel cell stack by switching the air using a second supply path switching unit and is supplied to the second discharge passage or the confluent part,
- wherein the control unit operates the first fuel cell set based on a required output of the electric load, and when the second fuel cell set is stopped, starts to drive the first air supply unit, and then starts to drive the second air supply unit, and supplies air to the confluent part via the second bypass path.

15. The fuel cell system according to claim 14, wherein the second air supply unit is driven with an amount of discharge larger than that at a discharge pressure of the confluent part associated with the drive of the first fuel cell set.

16. The control method at the time of starting-up a fuel cell system according to claim 9, wherein the fuel cell system further includes:
- a third fuel cell set including a third fuel cell stack connected to the first fuel cell stack in series and a third air supply unit configured to supply air to the third fuel cell stack and a fourth fuel cell set including a fourth fuel cell stack connected to the second fuel cell stack in series and a fourth air supply unit configured to supply air to the fourth fuel cell stack, and
- the third air supply unit and the fourth air supply unit are electrically connected to the first air supply unit and the second air supply unit in parallel.

17. The control method at the time of starting-up a fuel cell system according to claim 9, wherein the fuel cell system further includes:
- a first discharge passage through which hydrogen is discharged from the first fuel cell stack;
- a second discharge passage through which hydrogen is discharged from the second fuel cell stack;
- a confluent part of the first discharge passage and the second discharge passage;

a first bypass path through which air supplied from the first air supply unit bypasses the first fuel cell stack by switching the air using a first supply path switching unit and is supplied to the first discharge passage or the confluent part; and a second bypass path through which air supplied from the second air supply unit bypasses the second fuel cell stack by switching the air using a second supply path switching unit and is supplied to the second discharge passage or the confluent part, the first fuel cell set is operated based on a required output of the electric load, when the second fuel cell set is stopped, the first air supply unit is started to be driven, and then the second air supply unit is started to be driven, and the air is supplied to the confluent part via the second bypass path.

* * * * *